US012626588B2

(12) United States Patent
Song et al.

(10) Patent No.: US 12,626,588 B2
(45) Date of Patent: May 12, 2026

(54) INFORMATION TRANSMISSION METHOD AND INFORMATION TRANSMISSION APPARATUS

(71) Applicant: Shenzhen Yinwang Intelligent Technologies Co., Ltd., Shenzhen (CN)

(72) Inventors: Sida Song, Beijing (CN); Sha Ma, Beijing (CN); Lei Gao, Beijing (CN); Lutao Gao, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 364 days.

(21) Appl. No.: 17/698,047

(22) Filed: Mar. 18, 2022

(65) Prior Publication Data

US 2022/0207998 A1 Jun. 30, 2022

Related U.S. Application Data

(63) Continuation of application No. PCT/CN2020/095041, filed on Jun. 9, 2020.

(30) Foreign Application Priority Data

Sep. 18, 2019 (CN) .......................... 201910883041.2

(51) Int. Cl.
$G08G\ 1/01$ (2006.01)
$H04W\ 4/40$ (2018.01)
$H04W\ 52/36$ (2009.01)
(52) U.S. Cl.
CPC ......... *G08G 1/0133* (2013.01); *G08G 1/0108* (2013.01); *H04W 4/40* (2018.02); *H04W 52/367* (2013.01)

(58) Field of Classification Search
CPC .. G08G 1/0133; G08G 1/0108; G08G 1/0104; G08G 1/04; G08G 1/161;
(Continued)

(56) References Cited

U.S. PATENT DOCUMENTS

2006/0109170 A1* 5/2006 Voigtlaender ......... G01S 13/931
342/159
2010/0289660 A1 11/2010 Bonne
2020/0065596 A1* 2/2020 Maeng .................. H04W 72/23

FOREIGN PATENT DOCUMENTS

CN 105242266 A 1/2016
CN 107561513 A 1/2018
(Continued)

*Primary Examiner* — Vladimir Magloire
*Assistant Examiner* — Remash R Guyah
(74) *Attorney, Agent, or Firm* — Leydig, Voit & Mayer, Ltd.

(57) ABSTRACT

This application provides an information transmission method and apparatus, relates to interference processing of a cooperative radar, and is applicable to internet of vehicles scenarios, such as a vehicle-to-everything (V2X) scenario, a long term evolution-vehicle (LTE-V) scenario, and a vehicle-to-vehicle (V2V) scenario. Therefore, information related to a transmit power can be transmitted through an interface of a radar detection apparatus, and a capability of an automated driving system or an advanced driver assistant system (ADAS) is improved, to adapt to a variable driving environment. The information transmission method includes: A first detection apparatus receives indication information, where the indication information is used to indicate the first detection apparatus to determine a first transmit power used for transmitting a radar signal; and the first detection apparatus determines the first transmit power based on the indication information.

18 Claims, 7 Drawing Sheets

(58) Field of Classification Search
    CPC ......... G08G 1/163; G08G 1/166; H04W 4/40;
               H04W 52/367; H04W 52/16; H04W
         52/50; H04W 52/322; H04W 4/44; H04W
        4/46; H04W 72/04; H04W 72/044; H04W
          72/12; G01S 7/023; G01S 13/867; G01S
         7/003; G01S 7/4013; G01S 13/931; G01S
          7/02; G01S 7/35; G01S 7/40–41; G01S
           13/86–93; H04B 7/185; H04B 7/26;
                   H04L 5/00; H04L 5/003
    USPC ......................................................... 342/82
    See application file for complete search history.

(56) References Cited

FOREIGN PATENT DOCUMENTS

| | | | | | |
|---|---|---|---|---|---|
| CN | 108375775 A | * | 8/2018 | ........... | G01S 17/931 |
| CN | 110155065 A | | 8/2019 | | |
| EP | 2755044 A1 | | 7/2014 | | |

* cited by examiner

100

200

300

400

INFORMATION TRANSMISSION METHOD AND INFORMATION TRANSMISSION APPARATUS

CROSS-REFERENCE TO RELATED APPLICATIONS

This application is a continuation of International Application No. PCT/CN2020/095041, filed on Jun. 9, 2020, which claims priority to Chinese Patent Application No. 201910883041.2, filed on Sep. 18, 2019. The disclosures of the aforementioned applications are hereby incorporated by reference in their entireties.

TECHNICAL FIELD

Embodiments of this application relate to the field of sensor technologies, and more specifically, to an information transmission method and an information transmission apparatus in the field of the sensor technologies.

BACKGROUND

With development of society and progress of science and technology, intelligent vehicles are entering the daily life of people. A sensor plays a very important role in self-driving or intelligent driving of an intelligent vehicle. As a key sensor in self-driving or intelligent driving, a radar detection apparatus is widely used in precision detection and distance detection in a self-driving process or an intelligent driving process.

In the conventional technology, a radar detection apparatus transmits a radar signal by using a fixed transmit power. However, there are diversified and variable driving environments in a driving process of a vehicle including the radar detection apparatus. Consequently, a method in the conventional technology cannot adapt to a variable driving environment, and flexibility is relatively poor.

SUMMARY

This application provides an information transmission method and apparatus, so that a radar detection apparatus can transmit, through an interface, information related to a transmit power used for transmitting a radar signal, to adapt to a variable driving environment and implement relatively high flexibility.

According to a first aspect, this application provides an information transmission method, and the method includes:

A first detection apparatus receives indication information, where the indication information is used to indicate the first detection apparatus to determine a first transmit power used for transmitting a radar signal.

The first detection apparatus determines the first transmit power based on the indication information.

Optionally, when there is an interface between the first detection apparatus and a processing apparatus, the first detection apparatus may receive the indication information sent by the processing apparatus.

Optionally, when there is an interface between the first detection apparatus and a communications apparatus, the first detection apparatus may receive the indication information sent by the communications apparatus.

Optionally, when there is an interface between the first detection apparatus and a processing apparatus, there is an interface between the processing apparatus and a communications apparatus, and there is no interface between the first detection apparatus and the communications apparatus, the first detection apparatus may receive the indication information sent by the communications apparatus through the processing apparatus.

According to the information transmission method provided in this embodiment of this application, there is an interface between the first detection apparatus and the processing apparatus or between the first detection apparatus and the communications apparatus for transmitting the indication information that is used to indicate the first transmit power used for transmitting the radar signal, so that the first detection apparatus can flexibly adjust, based on the indication information, a transmit power used for transmitting the radar signal, to adapt to a variable driving environment.

In a possible implementation, the method further includes: The first detection apparatus transmits the radar signal by using the first transmit power.

In a possible implementation, the method further includes: The first detection apparatus sends time-frequency resource information and at least one of power information and the indication information, where the power information is used to indicate the first transmit power, and the time-frequency resource information is used to indicate a time-frequency resource used for the radar signal.

Optionally, the first detection apparatus may send the power information and the time-frequency resource information: or the first detection apparatus may send the indication information and the time-frequency resource information: or the first detection apparatus may send the power information, the indication information, and the time-frequency resource information.

In a possible implementation, that the first detection apparatus sends time-frequency resource information and at least one of power information and the indication information includes: The first detection apparatus sends the time-frequency resource information and the at least one of the power information and the indication information to a communications apparatus, a processing apparatus, or a second detection apparatus.

For example, when there is an interface between the first detection apparatus and the communications apparatus, the first detection apparatus may send the foregoing various information to the communications apparatus. Correspondingly, after receiving the foregoing various information, the communications apparatus may broadcast the foregoing various information.

For another example, when there is an interface between the first detection apparatus and the processing apparatus, there is an interface between the processing apparatus and the communications apparatus, and there is no interface between the first detection apparatus and the communications apparatus, the first detection apparatus may send the foregoing various information to the communications apparatus through the processing apparatus. Correspondingly, the communications apparatus may broadcast the foregoing various information.

According to the information transmission method provided in this embodiment of this application, the time-frequency resource information and the at least one of the power information and the indication information are broadcast to another terminal, so that the another terminal determines, based on the foregoing various information, the first transmit power used by the first detection apparatus to transmit the radar signal on the allocated time-frequency resource. Therefore, the another terminal can determine, based on this, a time-frequency resource used by a radar detection apparatus of the another terminal to send a radar signal.

In other words, the another terminal learns of a time-frequency resource of each terminal around and a transmit power used by each terminal to transmit a radar signal on the time-frequency resource, and can determine whether each time-frequency resource is in an idle state or a busy state, so that a relatively idle time-frequency resource can be selected. This reduces interference between radar signals transmitted by radar detection apparatuses of different terminals.

Optionally, the first detection apparatus may broadcast the time-frequency resource information and the at least one of the power information and the indication information.

In a possible implementation, that the first detection apparatus determines the first transmit power based on the indication information includes: The first detection apparatus determines, based on the indication information, to adjust a currently used second transmit power to the first transmit power.

In a possible implementation, the indication information indicates a status of a traffic light that is closest to a terminal in a current driving direction in which the first detection apparatus is located, and the status of the traffic light includes a red light, a yellow light, or a green light.

In a possible implementation, that the first detection apparatus determines, based on the indication information, to adjust a second transmit power to the first transmit power includes: When the status of the traffic light is the red light, the first detection apparatus determines to adjust the second transmit power to the first transmit power, where the first transmit power is less than or equal to the second transmit power: or when the status of the traffic light is the green light, the first detection apparatus determines to adjust the second transmit power to the first transmit power, where the first transmit power is greater than or equal to the second transmit power.

In other words, when the traffic light is red, the first detection apparatus may decrease the currently used second transmit power, or when the second transmit power is a minimum power of the first detection apparatus, the first detection apparatus may maintain the second transmit power. When the traffic light is green, the first detection apparatus may increase the currently used second transmit power, or when the second transmit power is a maximum power of the first detection apparatus, the first detection apparatus may maintain the second transmit power. When the traffic light is yellow; the first detection apparatus may maintain the currently used second transmit power.

In a possible implementation, the indication information indicates a congestion status of a road in a current driving direction of a terminal in which the first detection apparatus is located, and the congestion status of the road includes a congested state, a normal state, or a clear state.

In a possible implementation, that the first detection apparatus determines, based on the indication information, to adjust a second transmit power to the first transmit power includes: When the congestion status of the road is the congested state, the first detection apparatus determines to adjust the second transmit power to the first transmit power, where the first transmit power is less than or equal to the second transmit power: or when the congestion status of the road is the clear state, the first detection apparatus determines to adjust the second transmit power to the first transmit power, where the first transmit power is greater than or equal to the second transmit power.

In other words, when the road is congested, the first detection apparatus may decrease the currently used second transmit power, or when the second transmit power is a minimum power of the first detection apparatus, the first detection apparatus may maintain the second transmit power. When the road is clear, the first detection apparatus may increase the currently used second transmit power, or when the second transmit power is a maximum power of the first detection apparatus, the first detection apparatus may maintain the second transmit power. When the road is normal, the first detection apparatus may maintain the currently used second transmit power.

According to the information transmission method provided in this embodiment of this application, in some cases (for example, in a case in which the traffic light is the red light or in a case in which the road is congested), when the first detection apparatus adjusts a transmit power to meet a detection requirement of the first detection apparatus, interference to another detection apparatus may be further reduced.

According to a second aspect, this application further provides an information transmission method. The method includes:

A first apparatus determines indication information, where the indication information is used to indicate a first detection apparatus to determine a first transmit power used for transmitting a radar signal.

The first apparatus sends the indication information to the first detection apparatus.

According to the information transmission method provided in this embodiment of this application, there is an interface between the first detection apparatus and the first apparatus for transmitting the indication information that is used to indicate the first transmit power used for transmitting the radar signal, so that the first apparatus can indicate, based on the indication information, the first detection apparatus to flexibly adjust a transmit power used for transmitting the radar signal, to adapt to a variable driving environment.

In a possible implementation, that a first apparatus determines indication information includes: The first apparatus receives the indication information sent by a second apparatus.

For example, when the first apparatus is a processing apparatus, the second apparatus may be a communications apparatus, a camera apparatus, or a navigation apparatus.

For another example, when the first apparatus is a communications apparatus, the second apparatus may be another terminal or device.

In a possible implementation, the method further includes: The first apparatus receives power information sent by the first detection apparatus based on the indication information, where the power information is used to indicate the first transmit power.

In a possible implementation, the method further includes: The first apparatus sends time-frequency resource information and at least one of the power information and the indication information, where the time-frequency resource information is used to indicate a time-frequency resource used for the radar signal.

In a possible implementation, that the first apparatus sends time-frequency resource information and at least one of the power information and the indication information includes: The first apparatus sends the time-frequency resource information and the at least one of the power information and the indication information to a communications apparatus.

According to the information transmission method provided in this embodiment of this application, the time-frequency resource information and the at least one of the power information and the indication information are broadcast to another terminal, so that the another terminal determines, based on the foregoing various information, the first transmit power used by the first detection apparatus to transmit the radar signal on the allocated time-frequency resource. Therefore, the another terminal can determine, based on this, a time-frequency resource used by a radar detection apparatus of the another terminal to send a radar signal.

In a possible implementation, the indication information indicates a status of a traffic light that is closest to a terminal in a current driving direction in which the first detection apparatus is located, and the status of the traffic light includes a red light, a yellow light, or a green light.

Optionally, the first apparatus may obtain a first image, where the first image includes the traffic light that is closest to the terminal in the current driving direction in which the first detection apparatus is located; and the first apparatus determines the indication information based on the status of the traffic light in the first image.

Optionally, the first apparatus may obtain a real-time updated electronic map, where the electronic map indicates the status of the traffic light that is closest to the terminal in the current driving direction in which the first detection apparatus is located; and determine the indication information based on the status of the traffic light that is indicated by the electronic map.

Optionally, the first apparatus may obtain traffic light information, where the traffic light information is used to indicate the status of the traffic light; and determine the status of the traffic light based on the traffic light information.

Optionally, the first apparatus may receive the traffic light information sent by the communications apparatus or the camera apparatus.

In a possible implementation, the indication information indicates a congestion status of a road in a current driving direction of a terminal in which the first detection apparatus is located, and the congestion status of the road includes a congested state, a normal state, or a clear state.

Optionally, the first apparatus may obtain a second image, where the second image includes another terminal in the current driving direction of the terminal in which the first detection apparatus is located: the first apparatus determines the congestion status of the road based on the second image; and the first apparatus determines the indication information based on the congestion status of the road.

Optionally, the first apparatus may further obtain a real-time updated electronic map, where the electronic map indicates the congestion status of the road in the current driving direction; determine the congestion status of the road based on the electronic map; and determine the indication information based on the congestion status.

Optionally, the first apparatus may further obtain vehicle traffic information, where the vehicle traffic information is used to indicate vehicle traffic or a vehicle queue length in the current driving direction: determine the congestion status of the road based on the vehicle traffic information; and determine the indication information based on the congestion status.

According to the information transmission method provided in this embodiment of this application, the first apparatus may indicate, in different driving environments, the first detection apparatus to flexibly adjust the first transmit power used for transmitting the radar signal, to adapt to a variable driving environment.

According to a third aspect, this application further provides an information transmission apparatus, configured to perform the method according to each of the foregoing aspects and any possible implementation of each of the foregoing aspects. Specifically, the information transmission apparatus may include a unit configured to perform the method according to each of the foregoing aspects and any possible implementation of each of the foregoing aspects.

According to a fourth aspect, this application further provides an information transmission apparatus. The apparatus includes a memory, a processor, a transceiver, and instructions that are stored in the memory and that can run on the processor. The memory, the processor, and a communications interface communicate with each other through an internal connection path. The processor executes the instructions to enable the apparatus to implement the method according to each of the foregoing aspects and any possible implementation of each of the foregoing aspects.

Optionally, the information transmission apparatus may be a vehicle-mounted terminal or a radar detection device in the vehicle-mounted terminal.

According to a fifth aspect, this application further provides a computer-readable storage medium, configured to store a computer program. The computer program includes instructions used to implement the method according to each of the foregoing aspects and any possible implementation of each of the foregoing aspects.

According to a sixth aspect, this application further provides a computer program product including instructions. When the computer program product runs on a computer, the computer is enabled to implement the method according to each of the foregoing aspects and any possible implementation of each of the foregoing aspects.

According to a seventh aspect, this application further provides a chip apparatus. The chip apparatus includes an input interface, an output interface, at least one processor, and a memory. The input interface, the output interface, the processor, and the memory communicate with each other through an internal connection path. The processor is configured to execute code in the memory. When the processor executes the code, the chip apparatus implements the method according to each of the foregoing aspects and any possible implementation of each of the foregoing aspects.

DESCRIPTION OF EMBODIMENTS

The following describes technical solutions in embodiments of this application with reference to the accompanying drawings in embodiments of this application.

Figure 1:
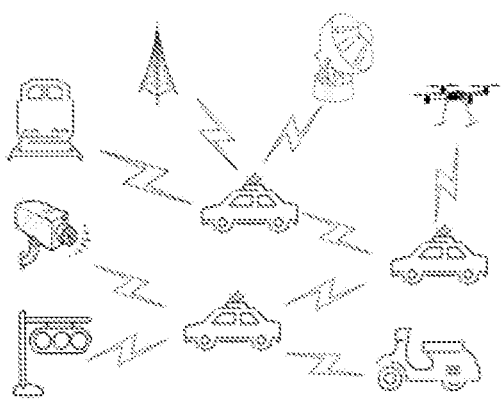
FIG. 1 is a schematic diagram of an application scenario according to an embodiment of this application.

FIG. 1 is a schematic diagram of an application scenario according to an embodiment of this application. The application scenario may be self-driving, automated driving, intelligent driving, networked driving, or the like.

It should be noted that a radar detection apparatus may be installed on a terminal, for example, a terminal having a radar signal transmission requirement, such as a motor vehicle (for example, an unmanned vehicle, an intelligent vehicle, an electric vehicle, or a digital vehicle), a drone, a rail vehicle, a bicycle, or a traffic light.

Optionally, the terminal may be mobile or fixed. This is not limited in this embodiment of this application.

Optionally, in addition to installing the radar detection apparatus, the foregoing terminal may further install a processing apparatus and a communications apparatus.

Optionally, the radar detection apparatus may be, for example, a radar device: the processing apparatus may be, for example, a processor; and the communications apparatus may be, for example, a V2X device.

For example, the radar detection apparatus, the processing apparatus, and the communications apparatus may be installed on the terminal as a vehicle-mounted system or a vehicle-mounted terminal of the terminal.

Optionally, the foregoing vehicle-mounted system may further include another apparatus having another function, such as a camera apparatus or a navigation apparatus. This is not limited in this embodiment of this application.

It should be noted that locations and functions of the foregoing apparatuses are not limited in this embodiment of this application.

Figure 2:
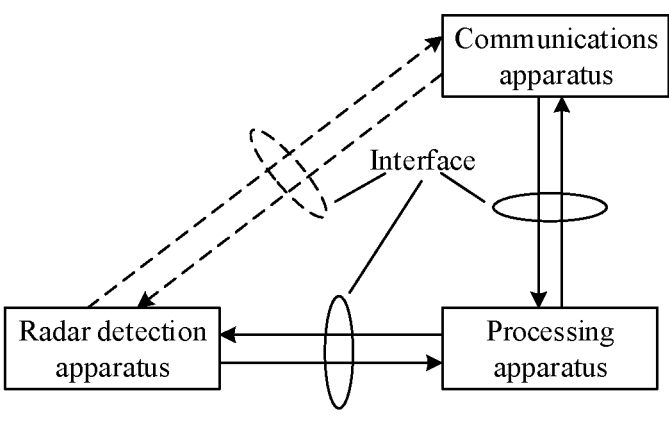
FIG. 2 is a schematic diagram of a system architecture according to an embodiment of this application.

FIG. 2 is a diagram of a system architecture according to an embodiment of this application. The system includes a radar detection apparatus, a processing apparatus, and a communications apparatus.

Optionally, the radar detection apparatus may communicate with the processing apparatus.

In a possible implementation, the radar detection apparatus may communicate with the processing apparatus in a wired manner or a wireless manner.

For example, the radar detection apparatus has an interface for communicating with the processing apparatus, and the processing apparatus also has an interface for communicating with the radar detection apparatus. The radar detection apparatus and the processing apparatus communicate with each other through a corresponding interface.

Optionally, the processing apparatus may communicate with the communications apparatus.

In a possible implementation, the processing apparatus may communicate with the communications apparatus in a wired manner or a wireless manner.

For example, the processing apparatus has an interface for communicating with the communications apparatus, and the communications apparatus also has an interface for communicating with the processing apparatus. The communications apparatus and the processing apparatus communicate with each other through a corresponding interface.

Optionally, the communications apparatus may further communicate with the radar detection apparatus.

In a possible implementation, the communications apparatus may communicate with the radar detection apparatus in a wired manner or a wireless manner.

For example, the radar detection apparatus has an interface for communicating with the communications apparatus, and the communications apparatus also has an interface for communicating with the radar detection apparatus. The radar detection apparatus and the communications apparatus communicate with each other through a corresponding interface.

It should be noted that the foregoing wired manner may be implementing communication through a data cable connection or through an internal bus connection.

It should be noted that the foregoing wireless manner may be implementing communication through a communications network. The communications network may be a local area network, or may be a wide area network transferred through a relay device, or may include a local area network and a wide area network. For example, when the communications network is a local area network, the communications network may be a short-range communications network such as a Wi-Fi hotspot network, a Wi-Fi P2P network, a Bluetooth network, a ZigBee network, or a near field communication (NFC) network. When the communications network is a wide area network, for example, the communications network may be a 3rd generation mobile communications technology (3G) network, a 4th generation mobile communications technology (4G) network, a 5th generation mobile communications technology (5G) network, a future evolved public land mobile network (PLMN), or an internet. This is not limited in this embodiment of this application.

Optionally, the radar detection apparatus, the processing apparatus, and the communications apparatus may be three independent apparatuses, and the three apparatuses may be separately installed on the terminal. Alternatively, the radar detection apparatus, the processing apparatus, and the communications apparatus may be integrated into one device, and the device is installed on the terminal. Alternatively, the radar detection apparatus and the processing apparatus may be integrated into one device, and the device and the communications apparatus are separately installed on the terminal. Alternatively, the radar detection apparatus and the communications apparatus may be integrated into one device, and the device and the processing apparatus are separately installed on the terminal. Alternatively, the processing apparatus and the communications apparatus may be integrated into one device, and the device and the radar detection apparatus are separately installed on the terminal.

It should be noted that, regardless of whether the radar detection apparatus, the processing apparatus, and the communications apparatus are integrated into one device or are independent apparatuses, the following descriptions are provided from the perspective of the radar detection apparatus, the processing apparatus, and the communications apparatus.

Figure 3:
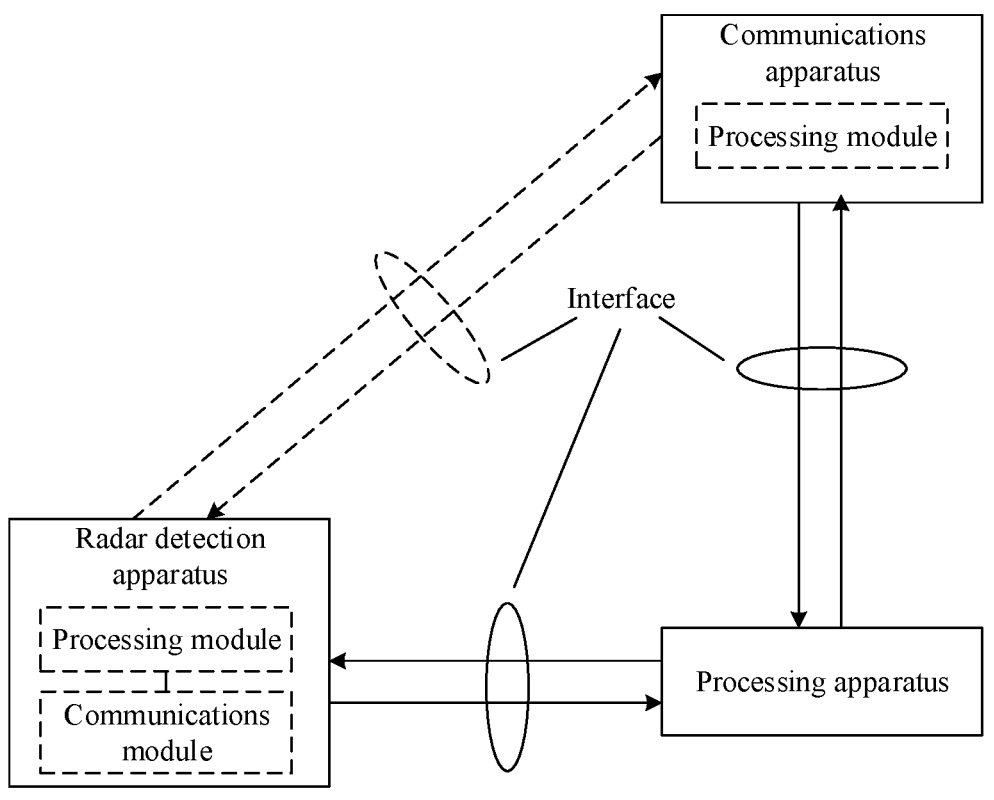
FIG. 3 is a schematic diagram of another system architecture according to an embodiment of this application.

Optionally, as shown in FIG. 3, the radar detection apparatus may further have a processing function and/or a communication function. For example, the radar detection apparatus may be integrated with a processing module or a communications module. The communications apparatus may further have a processing function. For example, the communications apparatus may be integrated with a processing module. This is not limited in this embodiment of this application.

Figure 4:
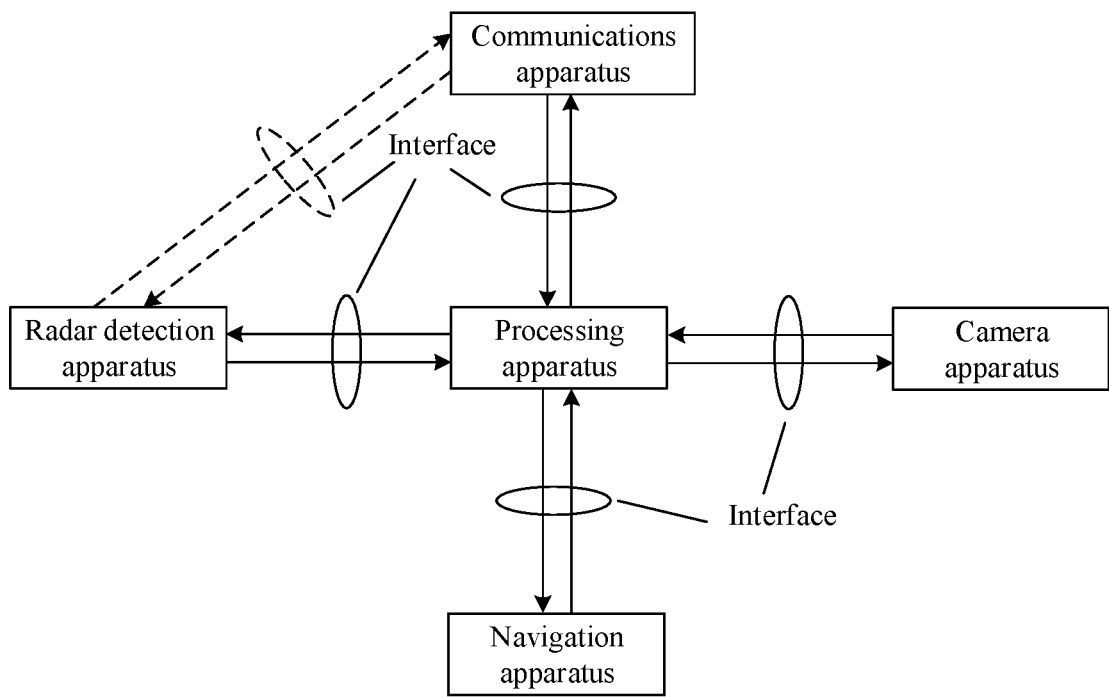
FIG. 4 is a schematic diagram of still another system architecture according to an embodiment of this application.

Optionally, as shown in FIG. 4, the system may further include a navigation apparatus and a camera apparatus.

It should be noted that the processing apparatus may communicate with the navigation apparatus.

In a possible implementation, the processing apparatus may navigate with the navigation apparatus in a wired manner. For example, the processing apparatus has an interface for navigating with the navigation apparatus, and the navigation apparatus also has an interface for navigating with the processing apparatus. The navigation apparatus and the processing apparatus navigate through a corresponding interface.

In another possible implementation, the processing apparatus may communicate with the navigation apparatus in a wireless manner. For example, the processing apparatus may communicate with the navigation apparatus through a communications network.

It should be further noted that the processing apparatus may communicate with the camera apparatus.

In a possible implementation, the processing apparatus may perform photographing with the camera apparatus in a wired manner. For example, the processing apparatus has an interface for performing photographing with the camera apparatus, and the camera apparatus also has an interface for performing photographing with the processing apparatus. The camera apparatus and the processing apparatus perform photographing through a corresponding interface.

In another possible implementation, the processing apparatus may communicate with the camera apparatus in a wireless manner. For example, the processing apparatus may communicate with the camera apparatus through a communications network.

Optionally, the navigation apparatus may be an electronic navigation device, and the electronic navigation device may include an electronic map.

Optionally, the camera apparatus may be a photographing device or a video shooting device.

Optionally, the navigation apparatus or the camera apparatus may further have a processing function. For example, the navigation apparatus may be integrated with a processing module, or the camera apparatus may be integrated with a processing module. This is not limited in this application.

Optionally, the system may further include another apparatus having another function. This is not limited in this embodiment of this application. For example, the system may further include a display and a sensor.

Figure 5:
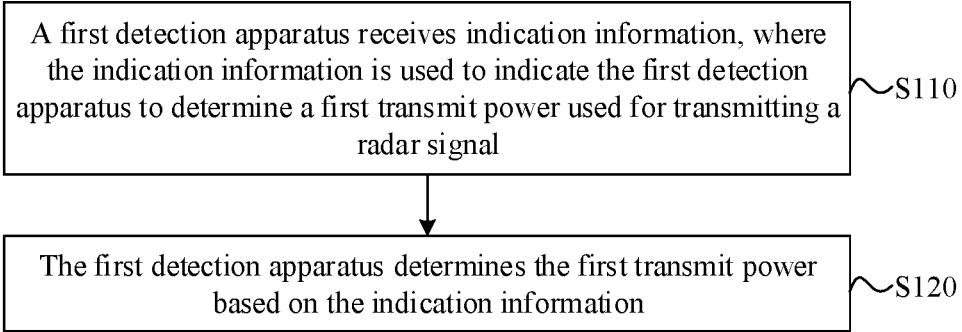
FIG. 5 is a schematic flowchart of an information transmission method 100 according to an embodiment of this application.

FIG. 5 is a schematic flowchart of an information transmission method 100 according to an embodiment of this application. The method 100 is applicable to the application scenario in FIG. 1 and the system in FIG. 2 to FIG. 4.

S110: A first detection apparatus receives indication information, where the indication information is used to indicate the first detection apparatus to determine a first transmit power used for transmitting a radar signal.

S120: The first detection apparatus determines the first transmit power based on the indication information.

It should be noted that the first detection apparatus may be the radar detection apparatuses in FIG. 2 to FIG. 4.

Optionally, in S110, the first detection apparatus may receive the indication information in a plurality of different manners. This is not limited in this embodiment of this application.

In a first possible implementation, when there is an interface between the first detection apparatus and a processing apparatus, the first detection apparatus may receive the indication information sent by the processing apparatus.

In a second possible implementation, when there is an interface between the first detection apparatus and a communications apparatus, the first detection apparatus may receive the indication information sent by the communications apparatus.

In a third possible implementation, when there is an interface between the first detection apparatus and a processing apparatus, there is an interface between the processing apparatus and a communications apparatus, and there is no interface between the first detection apparatus and the communications apparatus, the first detection apparatus may receive the indication information sent by the communications apparatus through the processing apparatus.

Optionally, in S110, the indication information may be in a plurality of different forms. This is not limited in this embodiment of this application.

In a first possible implementation, the indication information may directly indicate the first transmit power. Correspondingly, in S120, the first detection apparatus may determine the first transmit power based on the indication information.

For example, the indication information includes a plurality of bits, and indicates the first transmit power by using the plurality of bits.

In a second possible implementation, the indication information may indicate an offset between the first transmit power and a currently used second transmit power, and the offset indicates the first transmit power. Correspondingly, in S120, the first detection apparatus may determine the first transmit power based on the offset.

For example, the currently used second transmit power is M, and the indication information may include an offset $\Delta=-m$. It may be learned that the first transmit power is M-m.

In a third possible implementation, the indication information may indicate a status of a traffic light that is closest to a terminal in a current driving direction in which the first detection apparatus is located, and the status of the traffic light includes a red light, a yellow light, or a green light. Correspondingly, in S120, the first detection apparatus may determine, based on the status of the traffic light, to adjust a currently used second transmit power to the first transmit power.

For example, when the status of the traffic light is the red light, the first detection apparatus may determine to adjust the second transmit power to the first transmit power, where the first transmit power is less than or equal to the second transmit power.

In other words, when the traffic light is red, the first detection apparatus may decrease the currently used second transmit power, or when the second transmit power is a minimum power of the first detection apparatus, the first detection apparatus may maintain the second transmit power.

For another example, when the status of the traffic light is the green light, the first detection apparatus may determine to adjust the second transmit power to the first transmit power, where the first transmit power is greater than or equal to the second transmit power.

In other words, when the traffic light is green, the first detection apparatus may increase the currently used second transmit power, or when the second transmit power is a maximum power of the first detection apparatus, the first detection apparatus may maintain the second transmit power.

For another example, when the status of the traffic light is the yellow light, the first detection apparatus may determine to keep the second transmit power unchanged, in other words, the first transmit power is equal to the second transmit power.

In other words, when the traffic light is the yellow light, the first detection apparatus may maintain the currently used second transmit power.

In a fourth possible implementation, the indication information may indicate a congestion status of a road in a current driving direction of a terminal in which the first detection apparatus is located, and the congestion status of the road includes a congested state, a normal state, or a clear state. Correspondingly, in S120, the first detection apparatus may determine, based on the status of the traffic light, to adjust a currently used second transmit power to the first transmit power.

For example, when the congestion status of the road is the congested state, the first detection apparatus determines to adjust the second transmit power to the first transmit power, where the first transmit power is less than the second transmit power.

In other words, when the road is congested, the first detection apparatus may decrease the currently used second transmit power, or when the second transmit power is a minimum power of the first detection apparatus, the first detection apparatus may maintain the second transmit power.

For another example, when the congestion status of the road is the clear state, the first detection apparatus determines to adjust the second transmit power to the first transmit power, where the first transmit power is greater than or equal to the second transmit power.

In other words, when the road is clear, the first detection apparatus may increase the currently used second transmit power, or when the second transmit power is a maximum power of the first detection apparatus, the first detection apparatus may maintain the second transmit power.

For another example, when the congestion status of the road is the normal state, the first detection apparatus determines to keep the second transmit power unchanged, in other words, the first transmit power is equal to the second transmit power.

In other words, when the road is normal, the first detection apparatus may maintain the currently used second transmit power.

According to the information transmission method provided in this embodiment of this application, there is an interface between the first detection apparatus and the processing apparatus or between the first detection apparatus and the communications apparatus for transmitting the indication information that is used to indicate the first transmit power used for transmitting the radar signal, so that the first detection apparatus can flexibly adjust, based on the indication information, a transmit power used for transmitting the radar signal, to adapt to a variable driving environment.

In addition, in some cases (for example, in a case in which the traffic light is the red light or in a case in which the road is congested), when the first detection apparatus adjusts a transmit power to meet a detection requirement of the first detection apparatus, interference to another detection apparatus may be further reduced.

Optionally, after S120, the method may further include: The first detection apparatus transmits the radar signal by using the first transmit power.

Optionally, after S120, the method may further include: The first detection apparatus sends time-frequency resource information and at least one of power information and the indication information, where the power information is used to indicate the first transmit power, and the time-frequency resource information is used to indicate a time-frequency resource used for the radar signal.

It should be noted that there is no sequence of performing two steps after S120.

Optionally, the first detection apparatus may send the power information and the time-frequency resource information: or the first detection apparatus may send the indication information and the time-frequency resource information: or the first detection apparatus may send the power information, the indication information, and the time-frequency resource information.

Optionally, the first detection apparatus may send the time-frequency resource information and the at least one of the power information and the indication information in a plurality of different manners. This is not limited in this embodiment of this application.

In a possible implementation, the first detection apparatus may send the time-frequency resource information and the at least one of the power information and the indication information to a communications apparatus, a processing apparatus, or a second detection apparatus. The second detection apparatus may be a radar detection apparatus installed on another terminal. For example, when there is an interface between the first detection apparatus and the communications apparatus, the first detection apparatus may send the foregoing various information to the communications apparatus. Correspondingly, after receiving the foregoing various information, the communications apparatus may broadcast the foregoing various information.

For another example, when there is an interface between the first detection apparatus and the processing apparatus, there is an interface between the processing apparatus and the communications apparatus, and there is no interface between the first detection apparatus and the communications apparatus, the first detection apparatus may send the foregoing various information to the communications apparatus through the processing apparatus. Correspondingly, the communications apparatus may broadcast the foregoing various information.

In another possible implementation, the first detection apparatus may broadcast the time-frequency resource information and the at least one of the power information and the indication information.

For example, as shown in FIG. 3, the first detection apparatus includes a communications module, and the first detection apparatus may broadcast the foregoing various information through the communications module of the first detection apparatus.

For another example, the first detection apparatus may transmit a radar signal, where the radar signal carries the foregoing various information.

According to the information transmission method provided in this embodiment of this application, the time-frequency resource information and the at least one of the power information and the indication information are broadcast to another terminal, so that the another terminal determines, based on the foregoing various information, the first transmit power used by the first detection apparatus to transmit the radar signal on the allocated time-frequency resource. Therefore, the another terminal can determine, based on this, a time-frequency resource used by a radar detection apparatus of the another terminal to send a radar signal.

In other words, the another terminal learns of a time-frequency resource of each terminal around and a transmit power used by each terminal to transmit a radar signal on the time-frequency resource, and can determine whether each time-frequency resource is in an idle state or a busy state, so that a relatively idle time-frequency resource can be selected. This reduces interference between radar signals transmitted by radar detection apparatuses of different terminals.

Figure 6:
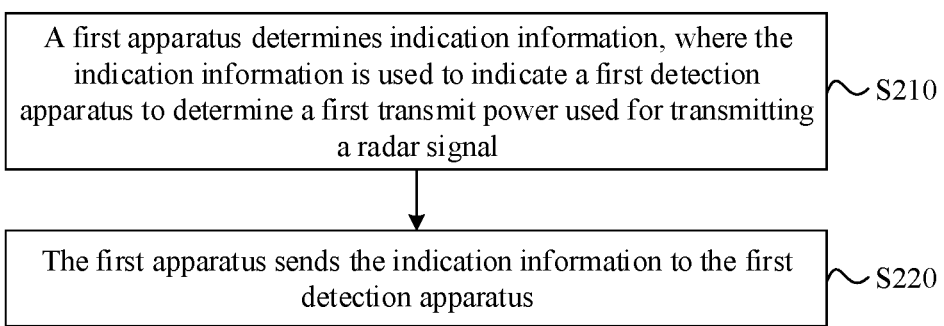
FIG. 6 is a schematic flowchart of an information transmission method 200 according to an embodiment of this application.

FIG. 6 is a schematic flowchart of an information transmission method 200 according to an embodiment of this application. The method 200 is applicable to the application scenario in FIG. 1 and the system in FIG. 2 to FIG. 4.

S210: A first apparatus determines indication information, where the indication information is used to indicate a first detection apparatus to determine a first transmit power used for transmitting a radar signal.

S220: The first apparatus sends the indication information to the first detection apparatus.

It should be noted that the first apparatus may be the processing apparatus or the communications apparatus in FIG. 2 to FIG. 4.

Optionally, in S210, the indication information may be in a plurality of different forms. This is not limited in this embodiment of this application.

In a first possible implementation, the indication information may directly indicate the first transmit power.

For example, the indication information includes a plurality of bits, and indicates the first transmit power by using the plurality of bits.

In a second possible implementation, the indication information may indicate an offset between the first transmit power and a currently used second transmit power, and the offset indicates the first transmit power.

For example, the currently used second transmit power is M, and the indication information may indicate an offset $\Delta=-m$.

In a third possible implementation, the indication information may indicate a status of a traffic light that is closest to a terminal in a current driving direction in which the first detection apparatus is located, and the status of the traffic light includes a red light, a yellow light, or a green light.

In a fourth possible implementation, the indication information may indicate a congestion status of a road in a current driving direction of a terminal in which the first detection apparatus is located, and the congestion status of the road includes a congested state, a normal state, or a clear state.

Optionally, in S210, the first apparatus may determine the indication information in a plurality of different manners. This is not limited in this embodiment of this application.

In a possible implementation, the first apparatus may receive the indication information sent by a second apparatus.

For example, when the first apparatus is a processing apparatus, the second apparatus may be a communications apparatus, a camera apparatus, or a navigation apparatus.

For another example, when the first apparatus is a communications apparatus, the second apparatus may be another terminal or device.

In another possible implementation, the first apparatus may determine the indication information.

A manner in which the first apparatus determines the indication information in the foregoing third and fourth possible implementations is described below in the following cases.

Case 1: The indication information indicates a status of a traffic light that is closest to a terminal in a current driving direction in which the first detection apparatus is located, and the status of the traffic light includes a red light, a yellow light, or a green light.

In a first possible implementation, the first apparatus may obtain a first image, where the first image includes the traffic light that is closest to the terminal in the current driving direction in which the first detection apparatus is located; and determine the indication information based on the status of the traffic light in the first image.

For example, as shown in FIG. 4, when the first apparatus is a processing apparatus, the processing apparatus may obtain the first image from a camera apparatus.

In a second possible implementation, the first apparatus may obtain a real-time updated electronic map, where the electronic map indicates the status of the traffic light that is closest to the terminal in the current driving direction in which the first detection apparatus is located; and determine the indication information based on the status of the traffic light that is indicated by the electronic map.

Specifically, the electronic map may indicate statuses of a plurality of traffic lights around the terminal in which the first detection apparatus is located; and the first apparatus may determine the status of the traffic light based on the electronic map and a location of the terminal, and determine the indication information based on the status of the traffic light.

For example, as shown in FIG. 4, when the first apparatus is a processing apparatus, the processing apparatus may obtain the electronic map from a navigation apparatus.

In a third possible implementation, the first apparatus may obtain traffic light information, where the traffic light information is used to indicate the status of the traffic light; and determine the indication information based on the status of the traffic light that is indicated by the traffic light information.

For example, as shown in FIG. 4, when the first apparatus is a processing apparatus, the processing apparatus may determine the traffic light information by scanning, by the camera apparatus, a two-dimensional code that is set on a roadside. The two-dimensional code is used to indicate the traffic light information in real time.

For another example, as shown in FIG. 4, when the first apparatus is a processing apparatus, the processing apparatus may obtain the traffic light information from a navigation apparatus.

Optionally, the first apparatus may determine the indication information in at least one of the foregoing three possible implementations. This is not limited in this embodiment of this application.

For example, the first apparatus may determine the indication information in one of the foregoing three possible implementations, and perform calibration in another possible implementation.

Further, the foregoing different implementations correspond to different priorities; and the first apparatus may determine that indication information determined in an implementation corresponding to a highest priority is final indication information.

Case 2: The indication information indicates a congestion status of a road in a current driving direction of a terminal in which the first detection apparatus is located, and the congestion status of the road includes a congested state, a normal state, or a clear state.

In a first possible implementation, the first apparatus may obtain a second image, where the second image includes another terminal in the current driving direction of the terminal in which the first detection apparatus is located: determine the congestion status of the road based on the second image; and determine the indication information based on the congestion status.

Specifically, the first apparatus may determine vehicle traffic or a vehicle queue length based on the second image; and determine the congestion status based on the vehicle traffic or the vehicle queue length.

For example, as shown in FIG. 4, when the first apparatus is a processing apparatus, the processing apparatus may obtain the second image from a camera apparatus.

In a second possible implementation, the first apparatus may obtain a real-time updated electronic map, where the electronic map indicates the congestion status of the road in the current driving direction; and determine the indication information based on the congestion status that is indicated by the electronic map.

In a third possible implementation, the first apparatus may obtain vehicle traffic information, where the vehicle traffic information is used to indicate vehicle traffic or a vehicle queue length in the current driving direction; and determine the indication information based on the vehicle traffic or the vehicle queue length that is indicated by the vehicle traffic information.

For example, as shown in FIG. 4, when the first apparatus is a processing apparatus, the processing apparatus may determine the vehicle traffic information by scanning, by the camera apparatus, a two-dimensional code that is set on a roadside. The two-dimensional code is used to indicate the vehicle traffic information in real time.

For another example, as shown in FIG. 4, when the first apparatus is a processing apparatus, the processing apparatus may obtain the vehicle traffic information from a navigation apparatus.

Optionally, the first apparatus may determine the indication information in at least one of the foregoing three possible implementations. This is not limited in this embodiment of this application.

For example, the first apparatus may determine the indication information in one of the foregoing three possible implementations, and perform calibration in another possible implementation.

Further, the foregoing different implementations correspond to different priorities; and the first apparatus may determine that indication information determined in an implementation corresponding to a highest priority is final indication information.

According to the information transmission method provided in this embodiment of this application, the first apparatus may indicate, in different driving environments, the first detection apparatus to flexibly adjust the first transmit power used for transmitting the radar signal, to adapt to a variable driving environment.

Optionally, after S220, the method may further include: The first apparatus receives power information sent by the first detection apparatus based on the indication information, where the power information is used to indicate the first transmit power.

Optionally, after S200, the method may further include: The first apparatus sends time-frequency resource information and at least one of the indication information and the power information, where the time-frequency resource information is used to indicate a time-frequency resource used for the radar signal.

Optionally, the first apparatus may send the time-frequency resource information and the at least one of the indication information and the power information in a plurality of different manners. This is not limited in this embodiment of this application.

In a possible implementation, when the first apparatus is a processing apparatus, the processing apparatus may send the time-frequency resource information and the at least one of the power information and the indication information to a communications apparatus or a second detection apparatus. The second detection apparatus may be a radar detection apparatus installed on another terminal.

For example, when there is an interface between the processing apparatus and the communications apparatus, the processing apparatus may send the foregoing various information to the communications apparatus. Correspondingly, after receiving the foregoing various information, the communications apparatus may broadcast the foregoing various information.

In a possible implementation, when the first apparatus is a communications apparatus, the communications apparatus may broadcast the time-frequency resource information and the at least one of the power information and the indication information.

In another possible implementation, when the first apparatus is a processing apparatus or a communications apparatus, the first apparatus may send the time-frequency resource information to the first detection apparatus. Correspondingly, the first detection apparatus may broadcast the time-frequency resource information and the at least one of the power information and the indication information.

According to the information transmission method provided in this embodiment of this application, the time-frequency resource information and the at least one of the power information and the indication information are broadcast to another terminal, so that the another terminal determines, based on the foregoing various information, the first transmit power used by the first detection apparatus to transmit the radar signal on the allocated time-frequency resource. Therefore, the another terminal can determine, based on this, a time-frequency resource used by a radar detection apparatus of the another terminal to send a radar signal.

In other words, the another terminal learns of a time-frequency resource of each terminal around and a transmit power used by each terminal to transmit a radar signal on the time-frequency resource, and can determine whether each time-frequency resource is in an idle state or a busy state, so that a relatively idle time-frequency resource can be selected. This reduces interference between radar signals transmitted by radar detection apparatuses of different terminals.

Figure 7:
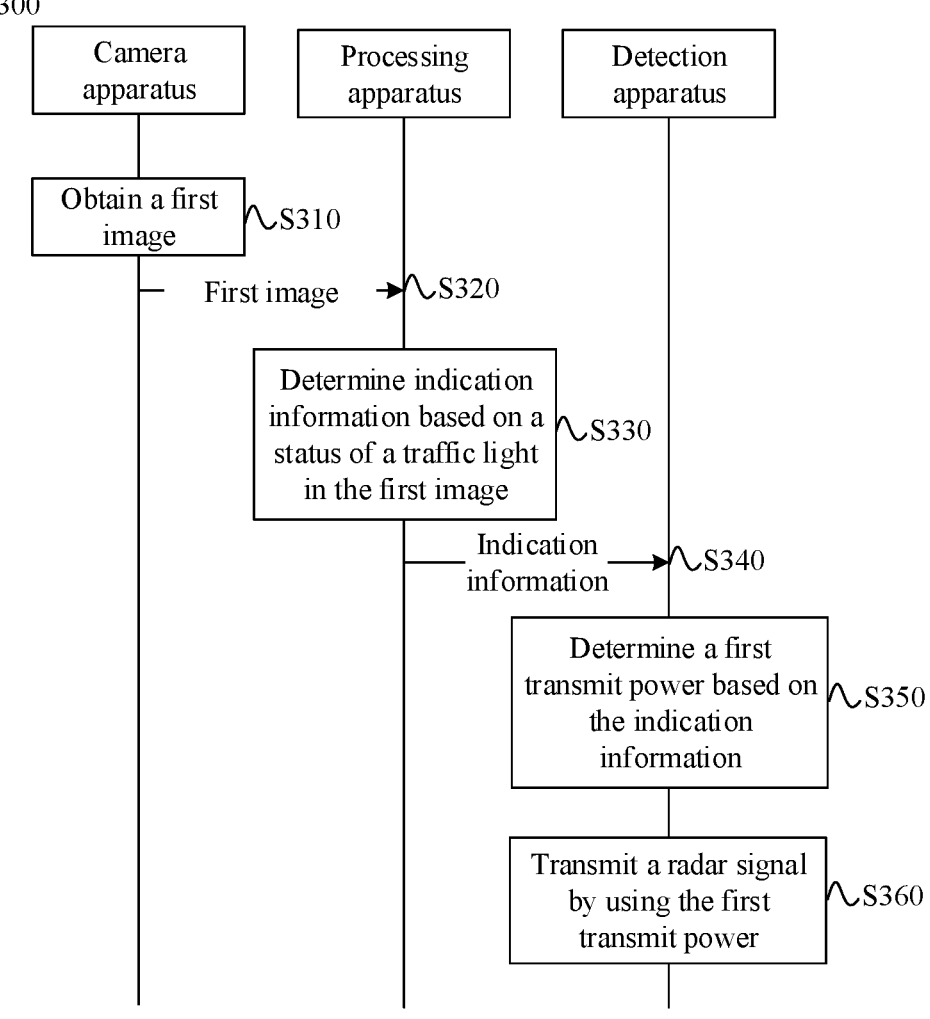
FIG. 7 is a schematic flowchart of an information transmission method 300 according to an embodiment of this application.

FIG. 7 is a schematic flowchart of an information transmission method 300 according to an embodiment of this application. The method 300 is applicable to the application scenario in FIG. 1 and the system in FIG. 2 to FIG. 4.

S310: A camera apparatus obtains a first image, where the first image includes a traffic light that is closest to a terminal in a current driving direction in which a detection apparatus is located.

S320: The camera apparatus sends the first image to a processing apparatus. Correspondingly, the processing apparatus receives the first image sent by the camera apparatus.

S330: The processing apparatus determines indication information based on a status of the traffic light in the first image, where the indication information is used to indicate the status of the traffic light.

Specifically, the processing apparatus may determine the status of the traffic light based on the first image, and determine the indication information based on the status of the traffic light. The status of the traffic light includes a red light, a yellow light, and a green light.

S340: The processing apparatus sends the indication information to the detection apparatus. Correspondingly, the detection apparatus receives the indication information sent by the processing apparatus.

S350: The detection apparatus determines, based on indication information, to adjust a currently used second transmit power to a first transmit power.

For example, when the status of the traffic light is the red light, the detection apparatus may determine to adjust the second transmit power to the first transmit power, where the first transmit power is less than or equal to the second transmit power.

For another example, when the status of the traffic light is the green light, the detection apparatus may determine to adjust the second transmit power to the first transmit power, where the first transmit power is greater than or equal to the second transmit power.

In other words, when the traffic light is red, the detection apparatus may decrease the currently used second transmit power based on the indication information: or when the traffic light is green, the detection apparatus may increase the currently used second transmit power based on the indication information.

For another example, when the status of the traffic light is the yellow light, the detection apparatus may determine to keep the second transmit power unchanged, in other words, the first transmit power is equal to the second transmit power.

S360: The detection apparatus transmits a radar signal by using the first transmit power.

Optionally, the method further includes: The detection apparatus sends power information to a communications apparatus through the processing apparatus, where the power information indicates the first transmit power.

Optionally, the method further includes: The communications apparatus broadcasts time-frequency resource information and at least one of the power information and the indication information, where the time-frequency resource information is used to indicate a time-frequency resource used by the detection apparatus to transmit the radar signal.

Figure 8:
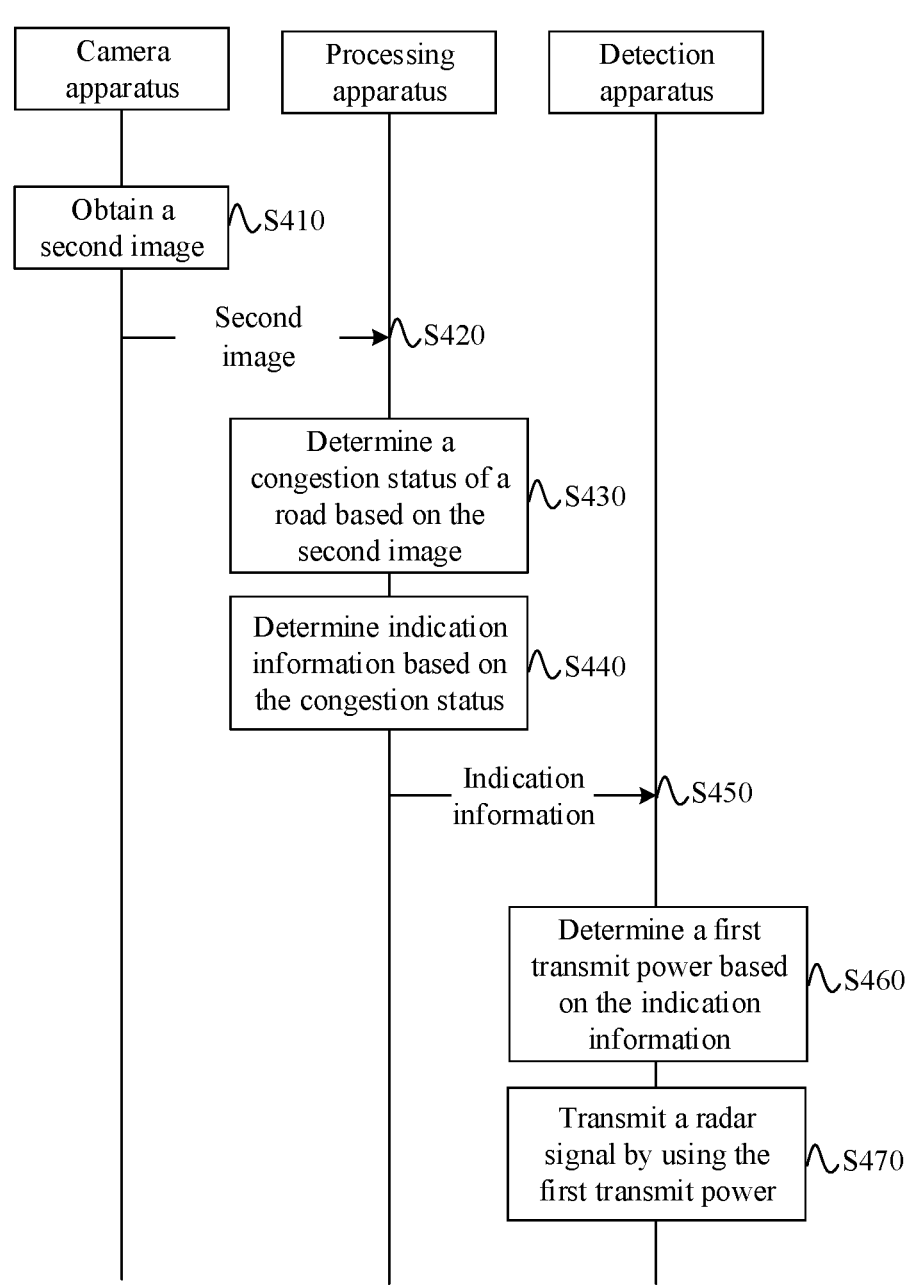
FIG. 8 is a schematic flowchart of an information transmission method 400 according to an embodiment of this application.

FIG. 8 is a schematic flowchart of an information transmission method 400 according to an embodiment of this application. The method 400 is applicable to the application scenario in FIG. 1 and the system in FIG. 2 to FIG. 4.

S410: A camera apparatus obtains a second image, where the second image includes another terminal in a current driving direction of a terminal in which a detection apparatus is located.

S420: The camera apparatus sends the second image to a processing apparatus. Correspondingly, the processing apparatus receives the second image sent by the camera apparatus.

S430: The processing apparatus determines, based on the first image, a congestion status of a road in the current driving direction of the terminal in which the detection apparatus is located, where the congestion status of the road includes a congested state, a normal state, or a clear state.

S440: The processing apparatus determines indication information based on the congestion status of the road, where the indication information is used to indicate the congestion status of the road.

S450: The processing apparatus sends the indication information to the detection apparatus. Correspondingly, the detection apparatus receives the indication information sent by the processing apparatus.

S460: The detection apparatus determines, based on the indication information, to adjust a currently used second transmit power to a first transmit power.

For example, when the congestion status of the road is the congested state, the detection apparatus determines to adjust the second transmit power to the first transmit power, where the first transmit power is less than or equal to the second transmit power.

For another example, when the congestion status of the road is the clear state, the detection apparatus determines to adjust the second transmit power to the first transmit power, where the first transmit power is greater than or equal to the second transmit power.

In other words, when the road is congested, the detection apparatus may decrease the currently used second transmit power based on the indication information: or when the road is clear, the detection apparatus may increase the currently used second transmit power based on the indication information.

For another example, when the congestion status of the road is the normal state, the detection apparatus determines to keep the second transmit power unchanged, in other words, the first transmit power is equal to the second transmit power.

S470: The detection apparatus transmits a radar signal by using the first transmit power.

Optionally, the method further includes: The detection apparatus sends power information to a communications apparatus through the processing apparatus, where the power information indicates the first transmit power.

Optionally, the method further includes: The communications apparatus broadcasts time-frequency resource information and at least one of the power information and the indication information, where the time-frequency resource information is used to indicate a time-frequency resource used by the detection apparatus to transmit the radar signal.

The foregoing describes in detail the information transmission methods provided in the embodiments of this application with reference to FIG. 1 to FIG. 8. The following describes information transmission apparatuses provided in the embodiments of this application with reference to FIG. 9 to FIG. 12.

Figure 9:
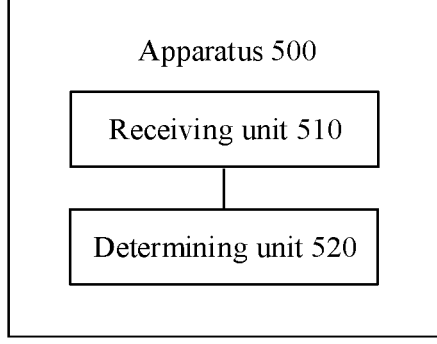
FIG. 9 is a schematic flowchart of an information transmission apparatus 500 according to an embodiment of this application.

FIG. 9 is a schematic block diagram of an information transmission apparatus 500 according to an embodiment of this application. The apparatus 500 includes:

a receiving unit 510, configured to receive indication information, where the indication information is used to indicate the first detection apparatus to determine a first transmit power used for transmitting a radar signal; and a determining unit 520, configured to determine the first transmit power based on the indication information.

Optionally, the apparatus further includes a sending unit, and the sending unit is configured to transmit the radar signal by using the first transmit power.

Optionally, the sending unit is further configured to send time-frequency resource information and at least one of power information and the indication information, where the power information is used to indicate the first transmit power, and the time-frequency resource information is used to indicate a time-frequency resource used for the radar signal.

Optionally, the sending unit is specifically configured to send the time-frequency resource information and the at least one of the power information and the indication information to a communications apparatus, a processing apparatus, or a second detection apparatus.

Optionally, the determining unit is specifically configured to determine, based on the indication information, to adjust a currently used second transmit power to the first transmit power.

Optionally, the indication information indicates a status of a traffic light that is closest to a terminal in a current driving direction in which the first detection apparatus is located, and the status of the traffic light includes a red light, a yellow light, or a green light.

Optionally, the determining unit is specifically configured to: when the status of the traffic light is the red light, determine to adjust the second transmit power to the first transmit power, where the first transmit power is less than or equal to the second transmit power: or when the status of the traffic light is the green light, determine to adjust the second transmit power to the first transmit power, where the first transmit power is greater than or equal to the second transmit power.

Optionally, the indication information indicates a congestion status of a road in a current driving direction of a terminal in which the first detection apparatus is located, and the congestion status of the road includes a congested state, a normal state, or a clear state.

Optionally, the determining unit is specifically configured to: when the congestion status of the road is the congested state, determine to adjust the second transmit power to the first transmit power, where the first transmit power is less than or equal to the second transmit power; or when the congestion status of the road is the clear state, determine to adjust the second transmit power to the first transmit power, where the first transmit power is greater than or equal to the second transmit power.

It should be understood that the apparatus 500 herein is embodied in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 500 may be specifically the first detection apparatus or the detection apparatus in the foregoing embodiments of the method 100 to the method 400. The apparatus 500 may be configured to perform procedures and/or steps corresponding to the first detection apparatus or the detection apparatus in the foregoing embodiments of the method 100 to the method 400. To avoid repetition, details are not described herein again.

Figure 10:
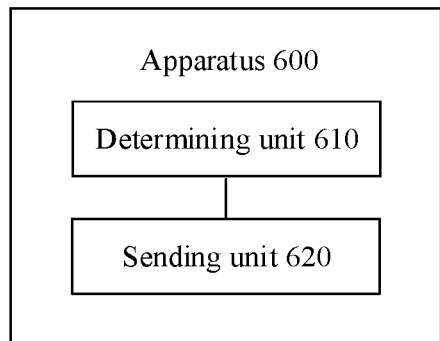
FIG. 10 is a schematic flowchart of an information transmission apparatus 600 according to an embodiment of this application.

FIG. 10 is a schematic block diagram of an information transmission apparatus 600 according to an embodiment of this application. The apparatus 600 includes:

a determining apparatus 610, configured to determine indication information, where the indication information is used to indicate a first detection apparatus to determine a first transmit power used for transmitting a radar signal; and a sending apparatus 620, configured to send the indication information to the first detection apparatus.

Optionally, the apparatus further includes a receiving unit, and the receiving unit is configured to receive the indication information sent by a second apparatus.

Optionally, the receiving unit is further configured to receive power information sent by the first detection apparatus based on the indication information, where the power information is used to indicate the first transmit power.

Optionally, the sending unit is configured to send time-frequency resource information and at least one of the power information and the indication information, where the time-frequency resource information is used to indicate a time-frequency resource used for the radar signal.

Optionally, the sending unit is specifically configured to send the time-frequency resource information and the at least one of the power information and the indication information to a communications apparatus.

Optionally, the indication information indicates a status of a traffic light that is closest to a terminal in a current driving direction in which the first detection apparatus is located, and the status of the traffic light includes a red light, a yellow light, or a green light.

Optionally, the determining unit is specifically configured to: obtain a first image, where the first image includes the traffic light that is closest to the terminal in the current driving direction in which the first detection apparatus is located; and determine the indication information based on the status of the traffic light in the first image.

Optionally, the indication information indicates a congestion status of a road in a current driving direction of a terminal in which the first detection apparatus is located, and the congestion status of the road includes a congested state, a normal state, or a clear state.

Optionally, the determining unit is specifically configured to: obtain a second image, where the second image includes another terminal in the current driving direction of the terminal in which the first detection apparatus is located: determine the congestion status of the road based on the second image; and determine the indication information based on the congestion status of the road.

It should be understood that the apparatus 600 herein is embodied in a form of a functional unit. The term "unit" herein may refer to an ASIC, an electronic circuit, a processor (for example, a shared processor, a dedicated processor, or a group processor) configured to execute one or more software or firmware programs, a memory, a merged logic circuit, and/or another appropriate component that supports the described functions. In an optional example, a person skilled in the art may understand that the apparatus 600 may be specifically the first apparatus or the processing apparatus in the foregoing embodiments of the method 100 to the method 400. The apparatus 600 may be configured to perform procedures and/or steps corresponding to the first apparatus or the processing apparatus in the foregoing embodiments of the method 100 to the method 400. To avoid repetition, details are not described herein again.

Figure 11:
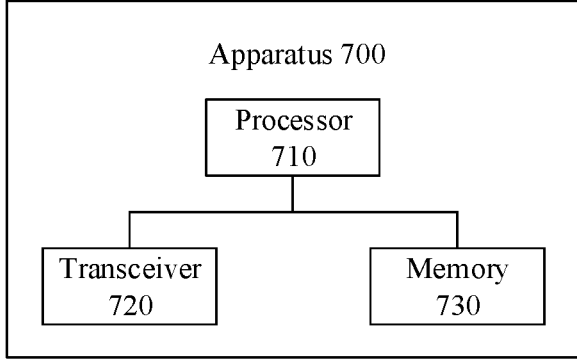
FIG. 11 is a schematic flowchart of an information transmission apparatus 700 according to an embodiment of this application.

FIG. 11 shows an information transmission apparatus 700 according to an embodiment of this application. The apparatus 700 may be the apparatus 500 in FIG. 9. The apparatus 500 may use a hardware architecture shown in FIG. 11. The apparatus 700 may include a processor 710, a transceiver 720, and a memory 730. The processor 710, the transceiver 720, and the memory 730 communicate with each other through an internal connection path. A related function implemented by the determining unit 520 in FIG. 9 may be implemented by the processor 710, and a related function implemented by the receiving unit 510 may be implemented by the processor 710 by controlling the transceiver 720.

The processor 710 may include one or more processors, for example, include one or more central processing units (CPUs). When the processor is one CPU, the CPU may be a single-core CPU or a multi-core CPU.

The transceiver 720 is configured to send and receive data and/or information, and receive data and/or information. The transceiver may include a transmitter and a receiver. The transmitter is configured to send data and/or a signal, and the receiver is configured to receive data and/or a signal.

The memory 730 includes but is not limited to a random access memory (RAM), a read-only memory (ROM), an erasable programmable read-only memory (EPROM), and a compact disc read-only memory (CD-ROM). The memory 730 is configured to store a related instruction and data.

The memory 730 is configured to store program code and data of the apparatus, and may be a separate component or integrated into the processor 710.

Specifically, the processor 710 is configured to control the transceiver to transmit a signal to a processing apparatus, a communications apparatus, and the like. For details, refer to the description in the foregoing method embodiments. Details are not described herein again.

It may be understood that FIG. 11 shows only a simplified design of the apparatus 700. During actual application, the apparatus 700 may further include other necessary elements, including but not limited to any quantity of transceivers, processors, controllers, memories, and the like, and all management devices that can be implemented in this application are within the protection scope of this application.

In a possible design, the apparatus 700 may be replaced with a chip apparatus, and is configured to implement a related function of the processor in the apparatus. The chip apparatus may be a field programmable gate array, a dedicated integrated chip, a system chip, a central processing unit, a network processor, a digital signal processing circuit, a microcontroller, a programmable controller, or another integrated chip for implementing the related function. Optionally, the chip may include one or more memories, configured to store program code. When the code is executed, the processor is enabled to implement a corresponding function.

Optionally, the apparatus 700 may be a vehicle-mounted terminal, for example, a radar detection device in the vehicle-mounted terminal.

Figure 12:
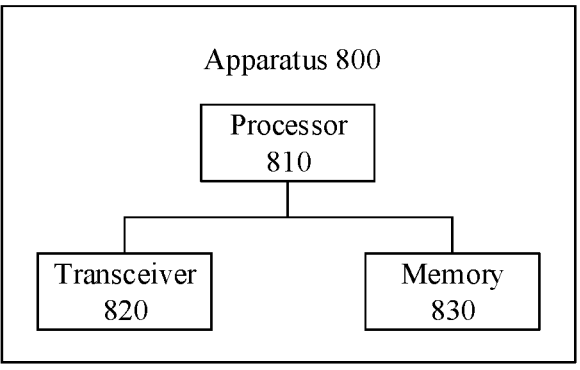
FIG. 12 is a schematic flowchart of an information transmission apparatus 800 according to an embodiment of this application.

FIG. 12 shows an information transmission apparatus 800 according to an embodiment of this application. The apparatus 800 may be the apparatus 600 in FIG. 10. The apparatus 600 may use a hardware architecture shown in FIG. 12. The apparatus 800 may include a processor 810, a transceiver 820, and a memory 830. The processor 810, the transceiver 820, and the memory 830 communicate with each other by using an internal connection path. In FIG. 10, a related function implemented by the determining unit 610 may be implemented by the processor 810, and a related function implemented by the sending unit 620 may be implemented by the processor 810 by controlling the transceiver 820.

The processor 810 may include one or more processors, for example, include one or more CPUs. When the processor is one CPU, the CPU may be a single-core CPU or a multi-core CPU.

The transceiver 820 is configured to send and receive data and/or information, and receive data and/or information. The transceiver may include a transmitter and a receiver. The transmitter is configured to send data and/or a signal, and the receiver is configured to receive data and/or a signal.

The memory 830 includes but is not limited to a RAM, a ROM, an EPROM, and a CD-ROM. The memory 830 is configured to store a related instruction and data.

The memory 830 is configured to store program code and data of the apparatus, and may be a separate component or integrated into the processor 810.

Specifically, the processor 810 is configured to control the transceiver to transmit a signal to the first detection apparatus. For details, refer to the description in the foregoing method embodiments. Details are not described herein again.

It can be understood that FIG. 12 shows only a simplified design of the apparatus 800. During actual application, the apparatus 800 may further include other necessary elements, including but not limited to any quantity of transceivers, processors, controllers, memories, and the like, and all management devices that can be implemented in this application are within the protection scope of this application.

In a possible design, the apparatus 800 may be replaced with a chip apparatus, and is configured to implement a related function of the processor in the apparatus. The chip apparatus may be a field programmable gate array, a dedicated integrated chip, a system chip, a central processing unit, a network processor, a digital signal processing circuit, a microcontroller, a programmable controller, or another integrated chip for implementing the related function. Optionally, the chip may include one or more memories, configured to store program code. When the code is executed, the processor is enabled to implement a corresponding function.

Optionally, the apparatus 800 may be a vehicle-mounted terminal.

It should be understood that sequence numbers of the foregoing processes do not mean execution sequences in various embodiments of this application. The execution sequences of the processes should be determined according to functions and internal logic of the processes, and should not be construed as any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual coupling or direct coupling or communication connections may be implemented by using some interfaces. The indirect coupling or communication connections between the apparatuses or units may be implemented in an electrical form, a mechanical form, or other forms.

The units described as separate parts may or may not be physically separate, and parts displayed as units may or may not be physical units, and may be located at one position, or may be distributed on a plurality of network units. Some or all of the units may be selected based on an actual requirement to achieve the objectives of the solutions of the embodiments.

In addition, the functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing description is merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method carried out by operation of a first detection device and a communications device, the method comprising:
   receiving, by the first detection device, indication information used to instruct the first detection device to determine a first transmit power used for transmitting a radar signal;
   determining, by the first detection device and in accordance with the indication information, the first transmit power;
   sending, by the first detection device, for use by the communications device:
      time-frequency resource information that is used to indicate a time-frequency resource used for transmitting the radar signal, and at least one additional piece of information taken from the group consisting of:
      power information used to indicate the first transmit power, and
      the indication information;
   receiving, by the communications device, the time-frequency resource information and the at least one additional piece of information; and
   broadcasting, by the communications device, the time-frequency resource information and the at least one additional piece of information.

2. The method according to claim 1, further comprising:
   transmitting, by the first detection device, the radar signal by using the first transmit power.

3. The method according to claim 1, wherein the determining the first transmit power based on the indication information comprises:
   determining, by the first detection device based on the indication information, to adjust a second transmit power to the first transmit power, wherein the second transmit power is a currently used transmit power.

4. The method according to claim 3, wherein the indication information indicates a status of a traffic light that is closest to a terminal in a current driving direction in which the first detection device is located, and the status of the traffic light comprises a red light, a yellow light, or a green light.

5. The method according to claim 4, wherein the determining to adjust the second transmit power to the first transmit power comprises:
   based on the status of the traffic light being the red light, determining, by the first detection device, to adjust the second transmit power to the first transmit power, wherein the first transmit power is less than or equal to the second transmit power; or
   based on the status of the traffic light being the green light, determining, by the first detection device, to adjust the second transmit power to the first transmit power, wherein the first transmit power is greater than or equal to the second transmit power.

6. The method according to claim 3, wherein the indication information indicates a congestion status of a road in a current driving direction of a terminal in which the first detection device is located, and the congestion status of the road comprises a congested state, a normal state, or a clear state.

7. The method according to claim 6, wherein the determining to adjust the second transmit power to the first transmit power comprises:
   based on the congestion status of the road being the congested state, determining, by the first detection device, to adjust the second transmit power to the first transmit power, wherein the first transmit power is less than or equal to the second transmit power; or
   based on the congestion status of the road being the clear state, determining, by the first detection device, to adjust the second transmit power to the first transmit power, wherein the first transmit power is greater than or equal to the second transmit power.

8. An information transmission method carried out by a first device, a first detection device and a communications device, comprising:
   determining, by the first device, indication information used to instruct the first detection device to determine a first transmit power used for transmitting a radar signal;

sending, by the first device, the indication information to the first detection device; and sending, by the first detection device, for use by the communications device:

time-frequency resource information that is used to indicate a time-frequency resource used for transmitting the radar signal, and at least one additional piece of information taken from the group consisting of:

power information used to indicate the first transmit power, and the indication information;

receiving, by the communications device, the time-frequency resource information and the at least one additional piece of information; and broadcasting, by the communications device, the time-frequency resource information and the at least one additional piece of information.

9. The method according to claim 8, wherein the determining the indication information comprises:

receiving, by the first device, the indication information sent by a second device.

10. The method according to claim 8, further comprising:

receiving, by the first device, the power information sent by the first detection device based on the indication information, wherein the power information is used to indicate the first transmit power.

11. The method according to claim 8, wherein the indication information indicates a status of a traffic light that is closest to a terminal in a current driving direction in which the first detection device is located, and the status of the traffic light comprises a red light, a yellow light, or a green light.

12. The method according to claim 11, wherein the determining the indication information comprises:

obtaining, by the first device, a first image, wherein the first image comprises the traffic light that is closest to the terminal in the current driving direction in which the first detection device is located; and determining, by the first device, the indication information based on the status of the traffic light in the first image.

13. The method according to claim 8, wherein the indication information indicates a congestion status of a road in a current driving direction of a terminal in which the first detection device is located, and the congestion status of the road comprises a congested state, a normal state, or a clear state.

14. The method according to claim 13, wherein the determining the power control information comprises:

obtaining, by the first device, a second image, wherein the second image comprises another terminal in the current driving direction of the terminal in which the first detection device is located;

determining, by the first device, the congestion status of the road based on the second image; and determining, by the first device, the indication information based on the congestion status of the road.

15. An apparatus, comprising:

a processor;

a receiver; and a transmitter, wherein the receiver and the transmitter are coupled to the processor, and wherein:

the receiver is configured to receive indication information, used to instruct the first detection apparatus to determine a first transmit power used for transmitting a radar signal;

the processor is configured to determine, in accordance with the indication information, the first transmit power; and the transmitter is configured to send, for use by a communications device:

time-frequency resource information that is used to indicate a time-frequency resource used for transmitting the radar signal, and at least one additional piece of information taken from the group consisting of:

power information used to indicate the first transmit power, and the indication information;

wherein the communications device is configured to broadcast the time-frequency resource information and the at least one additional piece of information.

16. The apparatus according to claim 15, wherein the transmitter is configured to transmit the radar signal by using the first transmit power.

17. The apparatus according to claim 15, wherein the processor is configured to determine, based on the indication information, to adjust a second transmit power to the first transmit power, wherein the second transmit power is a currently used transmit power.

18. The apparatus according to claim 17, wherein the indication information indicates a status of a traffic light that is closest to a terminal in a current driving direction in which the first detection device is located, and the status of the traffic light comprises a red light, a yellow light, or a green light.

* * * * *